United States Patent [19]

Hoppe et al.

[11] Patent Number: 4,893,205
[45] Date of Patent: Jan. 9, 1990

[54] FLEXURE MOUNT FOR DISC DRIVES

[75] Inventors: Robert F. Hoppe, Santa Cruz; Terence H. West, Aptos; Chun-Jer C. Cheng, Saratoga, all of Calif.

[73] Assignee: Seagate Technology, Inc., Scotts Valley, Calif.

[21] Appl. No.: 220,553

[22] Filed: Jul. 18, 1988

[51] Int. Cl.⁴ ............................................. G11B 21/16
[52] U.S. Cl. .................................. 360/104; 360/98.01
[58] Field of Search .................... 360/104, 98.01, 105, 360/106

[56] References Cited

U.S. PATENT DOCUMENTS 4,331,991  5/1982  Morehouse et al. ................. 360/106

FOREIGN PATENT DOCUMENTS 0127058   12/1984  European Pat. Off. ............ 360/106
59-210576 11/1984  Japan .................................. 360/104
60-29988   2/1985  Japan .................................. 360/104
60-136978  7/1985  Japan .................................. 360/104
61-168178  7/1986  Japan .................................. 360/104

OTHER PUBLICATIONS

Research Disclosure, "Back-to-Back Mounting of Suspensions to Improve Disk Spacing in Magnetic Recording Disk Files", 28478, Dec. 1987, No. 284.

Primary Examiner—John H. Wolff
Attorney, Agent, or Firm—Flehr, Hohbach, Test, Albritton & Herbert

[57] ABSTRACT

An improved flexure mounting arrangement for a disc drive system having a head positioning apparatus located within a housing for locating a plurality of magnetic read/write heads relatvie to recording media disposed within the housing. The mounting system includes one or more flexure mounts each having a base, a pair of attachment arms each having a screwhole extending longitudinally therethrough and a flexure support pad. The attachment arms extend from opposite sides of the base and are substantially symmetrical about the longitudinal axis of the flexure. A pair of longitudinally extending screws may thus be used to secure the flexure mount to the head positioning apparatus. The flexure support pad is thinner than the base and extends distally therefrom. The top and bottom surfaces of the support pad are adapted to engage separate flexures, thereby allowing the flexure mount to support one or two flexures independently of any other flexures within the disc drive.

6 Claims, 5 Drawing Sheets

FLEXURE MOUNT FOR DISC DRIVES

The present invention relates generally to the field of disc drives. More particularly, the invention relates to a head support arrangement for individually mounting one or two head arm flexures to a head positioner assembly.

BACKGROUND OF THE INVENTION

Disc drive machines record and reproduce information stored on concentric circular information storage tracks on magnetic information storage discs. Conventional Winchester type disc drives include a plurality of vertically aligned rotating information storage discs, each having at least one associated magnetic head that is adapted to transfer information between the disc and an external system. Each head is carried by an elongated flexure arm. The flexure arms are vertically aligned and are each attached to a common head positioner assembly. The head positioner assembly is adapted to move the heads back and forth in unison across the face of the vertically aligned discs. The head positioner assembly may be either rotationally mounted, or may take the form of a linear carriage that is free to move back and forth along a single axis. In either case, the head positioner assembly is adapted to precisely position the heads relative to the magnetic discs.

During operation, the read/write heads and the flexures are occasionally known to fail and require repair. Therefore, it is desirable to provide a flexure mounting structure that allows replacement of individual heads. To minimize the skill and time required to replace individual heads, it is desirable to provide a mechanism for removing individual flexures without requiring the disassembly of the entire head positioner assembly or the removal of all of the head arms.

One conventional manner for mounting the head arms utilizes a head positioner assembly having a plurality of vertically aligned ears. Each head arm is than mounted to a single ear with one or two screws extending vertically through the vertically aligned ears to hold all of the head arms together. Such an approach has several disadvantages. First, anytime a single one of the read/write heads requires replacement, all of the head arms must be disassembled.

To maximize efficient information storage on the disc, it is important that once set, the heads move laterally as little as possible relative to the head positioner assembly. Movements on the order of several millionths of an inch can cause difficulties. However, in the mounting arrangement described above, thermal expansions and contractions within the screw and head positioner assembly can induce stresses within the screw and allow relieving of the screw's own internal torsional stresses induced while tightening that cause the screw to unwind a minute amount which results in lateral head movements large enough to cause troubles. Therefore, during production, the disc drive must be run through at least one thermal baking and cooling cycle to eliminate thermal stresses within the disc drive components including the flexure mounting arrangement. The thermal baking and cooling cycle is extremely time consuming and creates one of the major delays on a production line. Therefore, it is desirable to provide a flexure mounting structure that does not require thermal baking and cooling to minimize lateral movements of the heads.

SUMMARY OF THE INVENTION

Accordingly, it is a primary objective of the present invention to provide a flexure mounting structure that allows removal of individual flexures for maintenance and repair.

Another objective is to provide a flexure mounting structure that is compact yet easily accessible.

Another objective is to provide a flexure mounting structure that is less susceptible to movements of the read/write head due to thermal expansions and contractions.

To achieve the foregoing and other objects and in accordance with the purpose of the present invention, an improved flexure mounting arrangement is provided for a disc drive system having a head positioner assembly disposed within a housing for locating a plurality of magnetic read/write heads relative to recording media within the housing. The head positioning apparatus has a platforms suitable for coupling with a flexure mount that carries one or two flexures. The flexure mount has a base, a pair of attachment arms each having a screwhole extending longitudinally therethrough and a flexure support pad. The attachment arms extend from opposite sides of the base and are substantially symmetrical about the longitudinal axis of the flexure. A pair of longitudinally extending screws are used to secure the flexure mount to the head positioner assembly. The flexure support pad is thinner than the base and extends distally therefrom. The top and bottom surfaces of the support pad are adapted to engage separate flexures, thereby allowing the flexure mount to support one or two flexures independently of any other flexures within the disc drive.

In a preferred embodiment, the head positioner assembly includes a pivot housing having a plurality of platforms and a plurality of independent flexure mounts are provided to couple a multiplicity of vertically aligned head arms to the head positioner assembly. In another preferred embodiment, the head positioner assembly and the flexure mounts are fabricated from the same material.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
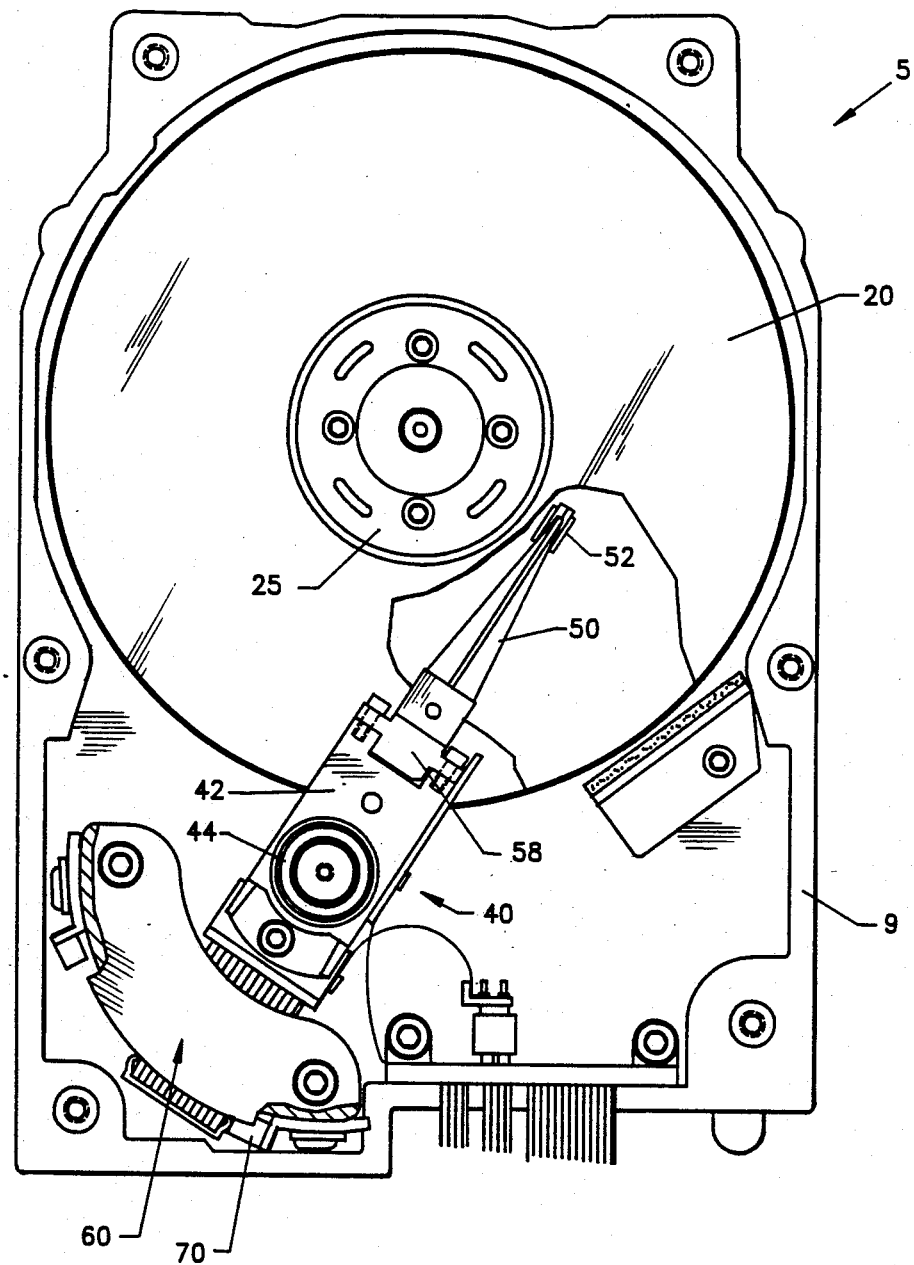
FIG. 1 is a top view of a disc drive that incorporates the present invention with its upper casing removed.
Figure 2:
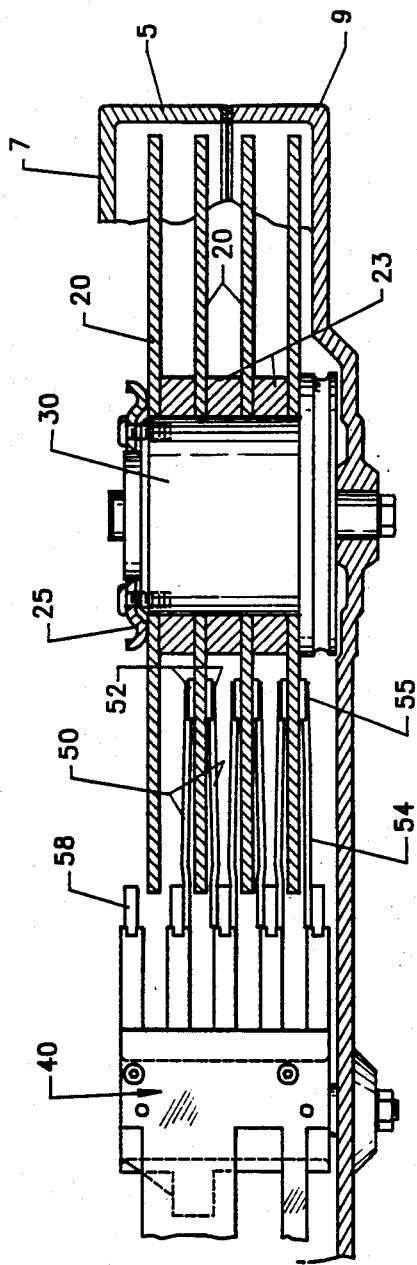
FIG. 2 is a side view of the disc drive shown in FIG. 1.
Figure 3:
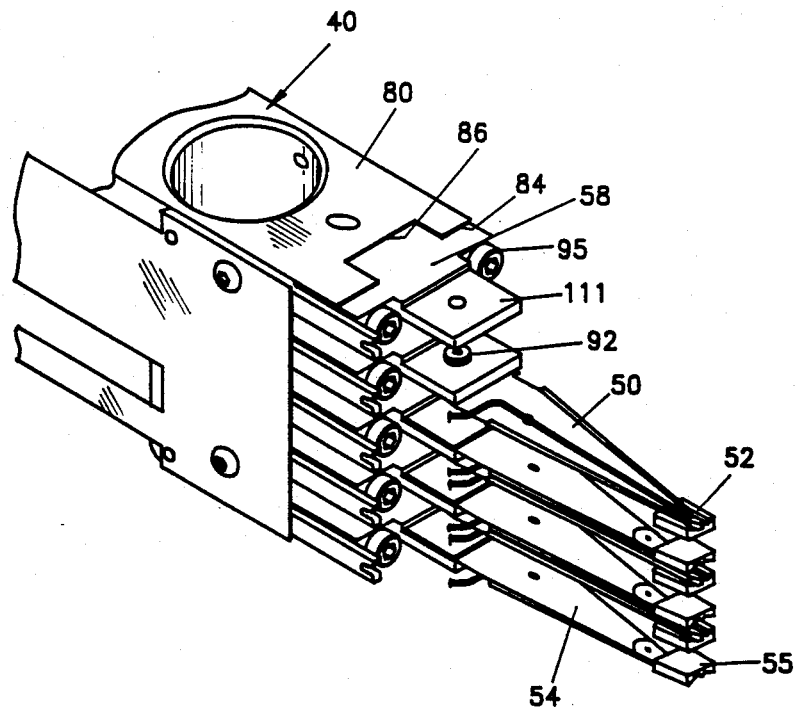
FIG. 3 is a perspective view of a head positioner assembly incorporating the flexure mounts of the present invention.

Referring first to FIGS. 1 & 2, a rotary disc drive system suitable for incorporating the teaching of the present invention is shown in diagrammatic form. A plurality of magnetic information storage discs 20 are journaled about a spindle motor assembly 30 within a housing 5 having upper and lower casing members 7 & 9 respectively. Each magnetic disc 20 has a multiplicity of concentric circular information storage tracks for recording information. A head positioner assembly 40 is rotatably mounted between the upper and lower casings 7,9 in one corner of the housing 5. The head positioner assembly 40 carries a plurality of head arm flexures 50 that each carry a magnetic read/write head 5 for reading information from and writing information onto the magnetic discs 20. The head positioner assembly 40 also carries a servo arm 54 which carries a servo head 55 for accurately positioning the magnetic heads 52 relative to the information storage tracks. The head and servo arms are each attached to the head positioner assembly 40 by individual flexure mounts 58. A voice coil motor 60 is adapted to precisely rotate the head positioner assembly back and forth such that the magnetic and servo heads move across the magnetic discs. A magnetic latch 70 holds the head positioner assembly in place when the disc drive is not in use.

The head positioner assembly 40 includes a pivot housing 80 having a plurality of vertically aligned platforms 82 that each form a mounting base for a single flexure mount 58. The platforms are identically sized and spaced approximately the same distance apart as the information storage discs 20 although the platforms 82 are staggered relative to the discs such that the discs would fit in between adjacent platforms. The distal end 84 of each platform 80 has an enlarged recess 86 and a pair of screwholes 88 disposed symmetrically on opposite sides of the recess 86.

Figure 4:
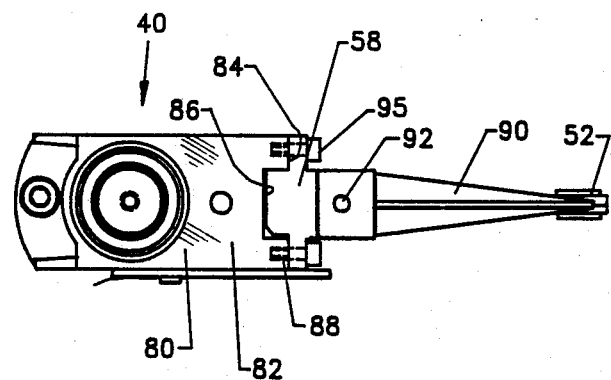
FIG. 4 is a top view of the head positioner assembly shown in FIG. 3.
Figure 5:
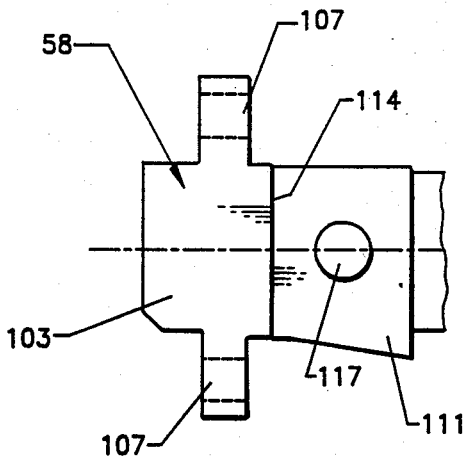
FIG. 5 is a top view of the flexure mount shown in FIG. 3.

As can best be seen in FIGS. 4 and 5, each magnetic head 52, 55 is carried by an elongated flexure 90 that is riveted to a flexure mount 58 by a rivet 92. The flexure mounts are then each individually attached to rotary head positioner assembly 40 by screws 95, which thread into recesses 86. As will be apparent to those skilled in the art, the described mounting arrangement is equally applicable to linear head carriages.

Figure 6:
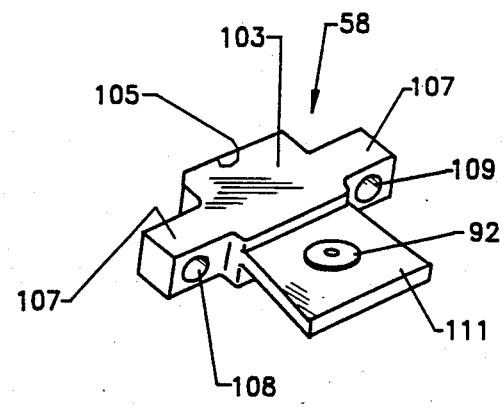
FIG. 6 is a perspective view of the flexure mount shown in FIG. 5.
Figure 7:
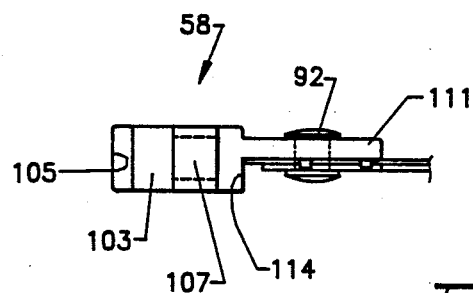
FIG. 7 is a side view of the flexure mount shown in FIG. 5.

Referring next to FIGS. 5–7, the flexure mount 58 chosen for the purposes of illustration looks somewhat like a compressed "t". It includes a base 103 having a flat proximal surface 105, a pair of attachment arms 107 having screwholes 108 and 109 extending longitudinally therethrough and a flexure support pad 111. The base 103 is sized to be tightly received within one of the platform recesses. The attachment arms are aligned with the screwholes 88 in pivot housing 80 and are symmetrical about the longitudinal axis of the head arms 50, 54. Screws 95 pass through screwholes 108–109 into screwholes 88 to secure the flexure mount to the pivot housing 80. The polygonal shaped flexure support pad 111 is thinner than base 103 and extends distally from the distal surface 114 of base 103. The flexure support pad 111 has a pair of mounting surfaces 116 (its top and bottom sides) and includes a borehole 117 adapted to receive rivet 92. The mounting surfaces 116 are flat and each can support an elongated flexure 90. As can best be seen with reference to FIG. 1, the top and bottom flexure mounts in any particular disc drive would typically only hold one flexure, while the middle flexure mounts would typically support a pair of flexures.

As indicated above, it is extremely important to the efficient operation of the disc drive that the data and servo heads do not drift laterally due to thermal expansions within the system. The symmetrical mounting arrangement described, wherein screws 95 couple the flexure mount 58 to the head positioner assembly 40 symmetrically about the longitudinal axis of the flexure minimizes lateral movements due to thermal expansion. As will be appreciated by those skilled in the art, even if thermal stresses do back the screws 95 slightly outward, the flexure mounts themselves will not move significantly. For the same reasons that the described mounting structure provides good thermal protection, it provides good shock balance as well.

The flexure mounts 58 are preferably formed from the same material as the pivot housing 80 to further reduce thermal influences on the lateral position of the read/write heads. There are a wide variety of materials suitable for forming both the pivot housing 80 and the flexure mount. By way of example, cast aluminum has been found to work well.

To precisely control the vertical alignment of the read/write heads, the tolerances for fabricating both the recesses 86 in the pivot housing and the proximal surface 105 of base 103 are very tight. By way of example, in the embodiment of a 3½ inch disc drive, machining tolerances of 0.001 inches per inch are appropriate.

A final advantage of the flexure mount construction described above is that the parts involved are extremely simple in terms of geometry and fabrication, making the present invention especially suitable for high volume production.

Although only a few embodiments of the present invention have been described herein, it should be understood that the present invention may be embodied in many other specific forms without departing from the spirit or scope of the invention. Particularly, it should be appreciated that the mounting structure described may be used on linear head positioner assemblies, as well as the rotary head positioner assemblies described. The actual material used to fabricate the flexure mount, as well as the actual tolerances used may be widely varied as well. Therefore, the present examples and embodiments are to be considered as illustrative and not restrictive, and the invention is not to be limited to the details given herein, but may be modified within the scope of the appended claims.

We claim:

1. A flexure mounting arrangement for a disc drive system having a head positioner assembly for positioning a plurality of transducer heads relative to a recording media located within a disc housing, the head positioner assembly having a plurality of platforms each arranged to carry at lest one flexure, each said flexure supporting one of said transducer heads, the flexure mounting arrangement comprising a plurality of flexure mounts having a longitudinal axis, each flexure mount including:

a base having a proximal protruding portion sized to mate with a recess in the mount's associated platform, the base being substantially perpendicular to said longitudinal axis;

a pair of attachment arms extending laterally from opposite sides of the base distally of said proximal protruding portion of the base, each attachment arm having a longitudinally extending screwhole that extends substantially parallel to the longitudinal axis of the mount, and a contact surface for engaging the mount's associated platform apart from said recess;

a flexure support pad extending distally from the base, the flexure support pad being thinner than the base and including flat support surfaces adapted to engage a selected one of said flexures;

means for coupling said selected flexure to said support pad; and attachment means for coupling said flexure mount to said head positioner assembly through said screwholes.

2. A flexure mounting arrangement for a disc drive system having a head positioning assembly for positioning a plurality of transducer heads relative to a recording media located within a disc housing, each transducer being carried by a particular flexure, the flexure mounting arrangement comprising a plurality of vertically aligned flexure mounts and a plurality of vertically aligned, spaced apart platforms carried by said head positioner assembly, each said platform being associated with a particular flexure mount and having a pair of boreholes and a platform recess disposed between the boreholes, said recess being sized to receive the base of an associated flexure mount, each said flexure mount having a longitudinal axis and including:

a base having a proximal protruding portion sized to be closely received by the recess in its associated platform;

a pair of attachment arms extending laterally from opposite sides of the base, distally of the proximal protruding portion of the base, each attachment arm having a longitudinally extending screwhole passing therethrough that extends substantially parallel to the longitudinal axis of the mount and a contact surface for engaging the associated platform apart from the associated platform's recess, the screwholes being aligned with the boreholes in the associated platform;

flexure support pad extending distally from the base, the flexure support pad being thinner than the base and including at least one flat support surface adapted to engage a selected one of said flexures;

means for coupling said selected flexure to said support pad; and attachment means for coupling said flexure mount to its associated platform through said screwholes and said platform boreholes, the screwholes for a particular flexure mount being aligned with the boreholes in the associated platform.

3. A disc drive system comprising:

a spindle hub having a longitudinal axis;

means for rotating said spindle hub about its longitudinal axis;

a plurality of information storage discs journaled about said spindle hub in spaced apart, vertically aligned relation said information storage discs being coupled to said spindle hub to rotate with the spindle hub;

a plurality of magnetic transducer heads;

a plurality of flexures, each said flexure supporting one of said transducer heads;

a head positioner assembly for positioning the transducers heads relative to the information storage discs, the head positioner assembly including a plurality of vertically aligned spaced apart platforms, each said platform having a pair of boreholes and a platform recess disposed between the boreholes;

means for moving said head positioner assembly back and forth to cause said transducer heads to move back and forth relative to said information storage discs;

a plurality of flexure mounts, each said flexure mount being coupled to a particular one of said platforms and including:

a base having a longitudinal axis and a proximal protruding portion that mates with the platform recess in its associated platform, a pair of attachment arms extending laterally from the base distally of said proximal protruding portion of the base, each said attachment arm having a longitudinally extending screwhole passing therethrough that extends substantially parallel to the longitudinal axis of the base, the screwholes being aligned with said boreholes in said platform, a flexure support pad extending distally from the base, the flexure support pad being thinner than the base and including at least one flat support surface adapted to engage a selected one of said flexures, and means for coupling said selected flexure to said support pad, and attachment means for coupling said flexure mount to said pivot housing through said screwholes and boreholes.

4. A disc drive as recited in claim 3 wherein said moving means includes:

a pivot mechanism, said head positioner assembly being journaled about the pivot mechanism; and a voice coil motor for rotating said head positioner assembly about said pivot mechanism.

5. A disc drive system as recited in claim 3 wherein said housing platforms are identically sized and spaced substantially the same distance apart as the information storage discs, the platforms being staggered relative to the discs.

6. A disc drive system as recited in claim 5 wherein said attachment means includes a pair of threaded screws.

* * * * *